United States Patent [19]

Muroi

[11] Patent Number: 4,918,731
[45] Date of Patent: Apr. 17, 1990

[54] SPEECH RECOGNITION METHOD AND APPARATUS

[75] Inventor: Tetsuya Muroi, Yokohama, Japan

[73] Assignee: Ricoh Company, Ltd., Japan

[21] Appl. No.: 213,826

[22] Filed: Jun. 30, 1988

[30] Foreign Application Priority Data

Jul. 17, 1987 [JP] Japan .............................. 62-179562
Aug. 13, 1987 [JP] Japan .............................. 62-202940

[51] Int. Cl.⁴ .............................................. G10L 7/08
[52] U.S. Cl. .......................................... 381/43; 381/41
[58] Field of Search ................................... 381/41-43

[56] References Cited

U.S. PATENT DOCUMENTS

| | | | |
|---|---|---|---|
| 3,816,722 | 6/1974 | Sakoe et al. | 381/43 |
| 4,053,710 | 10/1977 | Advani et al. | 381/42 |
| 4,400,828 | 8/1983 | Pirz et al. | 381/43 |
| 4,608,708 | 8/1986 | Watanabe | 381/43 |
| 4,761,815 | 8/1988 | Hitchcock | 381/43 |
| 4,783,804 | 11/1988 | Juang et al. | 381/43 |

OTHER PUBLICATIONS

Levinson, Computer and Speech Language, "Continuously Variable Duration Hidden Markov Models For Automatic Speech Recognition", Academic Press Inc. (London) Limited, 1986, pp. 29-45.

Itahashi et al., "Discrete—Word Recognition Utilizing a Word Dictionary and Phonological Rules", IEEE Trans. on Audio and Electroacoustics, vol. AU—21, No. 3, Jun. 1973, pp. 239-248.

Primary Examiner—Gary V. Harkcom
Assistant Examiner—David D. Knepper
Attorney, Agent, or Firm—Mason, Fenwick & Lawrence

[57] ABSTRACT

A reference speech pattern is described as a time series of a fixed number of states. Each of states is described with one feature vector (centroid) which represents a feature quantity of a speech portion contained in the state, and a duration time of that state. Pattern matching is carried out between the time series of feature vectors of the input speech pattern and the time series of the states which describe the reference pattern. A weighting function modifies the pattern matching distance depending on differences in duration times between the input speech and the reference pattern.

13 Claims, 9 Drawing Sheets

SPEECH RECOGNITION METHOD AND APPARATUS

BACKGROUND OF THE INVENTION

The present invention generally relates to a speech recognition method and an apparatus capable of implementing the same, and in particular to pattern matching between an unknown input pattern with a known reference pattern. Further, the present invention relates to a method of creating a reference speech pattern and an apparatus capable of implementing the same.

Currently, various speech recognition methods have been proposed. A dynamic programming method has been widely used as one of speech pattern matching methods. In the dynamic programming method, an unknown speech pattern is divided into a plurality of frames, and a local distance between a speech portion included in each of the divided frames and a corresponding speech portion of a reference pattern is calculated. Then the local distances thus obtained are sequentially accumulated. However, the dynamic programming method has a disadvantage that an amount of calculation on matching between an unknown input pattern and a known reference pattern is enormous. This disadvantage results from the fact that a number of lattice points at which local distances and accumulated distances are to be calculated, is proportional to a product of a number of frames of the input pattern and a number of frames of the reference pattern. In addition, a reference pattern must have a frame length corresponding to the whole of the speech section. It is to be noted that normally one speech section contains information which is not necessarily important to obtain a recognition result with a high accuracy.

From the above viewpoints, a compression dynamic programming method has been proposed, which is directed to reducing the number of lattice points. However, the compression dynamic programming method has a disadvantage that it is very difficult to determine which portions of the input speech pattern should be subjected to the compression process and what compression ratio should be used. Additionally, a processing for compressing the speech pattern is very complex. For example, a rate of compressed data to the original data of the speech pattern must be changed, depending on words to be identified. Further, the compression dynamic programming cannot greatly reduce the amount of calculation on the pattern matching.

An application of hidden Markov models (hereinafter simply referred to as HMM) has also been considered in use for the speech pattern matching, in which a probability of state transition is calculated. A number of lattice points at each of which a transition probability is calculated, corresponds to a product of a number of frames of an input speech pattern and a number of states defined in a model. The HMM can identify the unknown input pattern by an amount of calculation much smaller than that for the dynamic programming. In addition, the amount of calculation based on the HMM is constant without depending on different words, because the number of states is fixed. However, the HMM is a probability model, and therefore a control of the state transition in accordance with a variation of the speech as a function of time is very complex. Moreover, the reference pattern must be created from a large amount of patterns of speech to be registered, because the HMM is the probability mode.

SUMMARY OF THE INVENTION

Accordingly, a general object of the present invention is to provide a speech recognition method and an apparatus capable of implementing the method, in which the above-described disadvantages have been eliminated.

A more specific object of the present invention is to provide a speech recognition method and an apparatus capable of implementing the method, in which an unknown speech can be identified with a decreased amount of calculation on the pattern matching and a decreased number of reference patterns, without degrading an identification rate.

The above objects of the present invention are achieved by a method comprising the following steps. A first step is a step of extracting a feature vector (X) from an unknown input speech pattern which is composed of feature vectors ($X = x_1 x_2 x_3 \ldots x_I$) of speech data included in I number of frames of the unknown input speech pattern. A second step is a step of comparing the feature vector (X) of the input speech pattern with a plurality of reference patterns (Y). Each of the reference patterns (Y) is represented as a time series of N number of states, and each reference pattern is composed of a feature vector ($y_1 y_2 y_3 \ldots y_N$) which represents a feature quantity of each of the states and a duration time ($L = l_1, l_2, l_3, \ldots, l_N$) of each of the states. Local distances (d) among I number of feature vectors of the input speech pattern and N number of feature vectors of each of the reference patterns are calculated, and also a difference between the duration time of each of the states included in each of the reference patterns and a duration time of a corresponding state of the input pattern is calculated. A third step is a step of accumulating the obtained local distances in sequence along paths which extend from a beginning state to a last state out of the states of the reference pattern. A fourth step is a step of adding a weight (W) depending on the obtained difference in the duration time to the local distances when a transition of state occurs during the step of accumulating the local distances. A fifth step is a step of determining one optimum having the smallest accumulated distance (D) for each of the reference patterns. A sixth step is a step of selecting, as an identification result, one reference pattern having the optimum path having the accumulated distance smaller than the accumulated distances of the optimum paths of the other reference patterns.

Another object of the present invention is to provide a method and apparatus capable of creating and registering a reference pattern suitable for the above speech recognition.

The above another object of the present invention is achieved by a method comprising the following steps. A first step is a step of extracting a feature vector (X) from an input speech pattern in a dictionary, the feature vector being composed of feature vectors ($X = x_1 x_2 x_3 \ldots x_I$) of speech data included in I number of frames of the unknown input speech pattern. A second step is a step of dividing the input speech pattern into N number of speech pattern portions, so that the feature vectors are grouped into N number of states. A third step is a step of calculating a feature vector ($y_1 y_2 y_3 \ldots y_N$) representing a feature quantity of each of the states from the feature vectors included in each of the states. A fourth step is a step of calculating a duration time (L=$l_1$, $l_2$, $l_3$, ..., $l_N$) of each of the states. One reference pattern (Y) which is composed of the feature vector representing each of the states and the duration time of each of the states is created, and is registered in a dictionary memory.

Other objects, features and advantages of the present invention will become apparent from the following detailed description when read in conjunction with the accompanying drawings.

DETAILED DESCRIPTION

The present invention is based on speech recognition in which a waveform of a speech signal is converted to a time series of feature vectors. A reference speech pattern is described as a time series of a fixed number of states. Each of the states is described with one feature vector (centroid) which represents a feature quantity of a speech portion included therein and a duration time of that state. Pattern matching is carried out between the time series of feature vectors of the input speech pattern and the time series of the states which describe the reference pattern.

Figure 1:
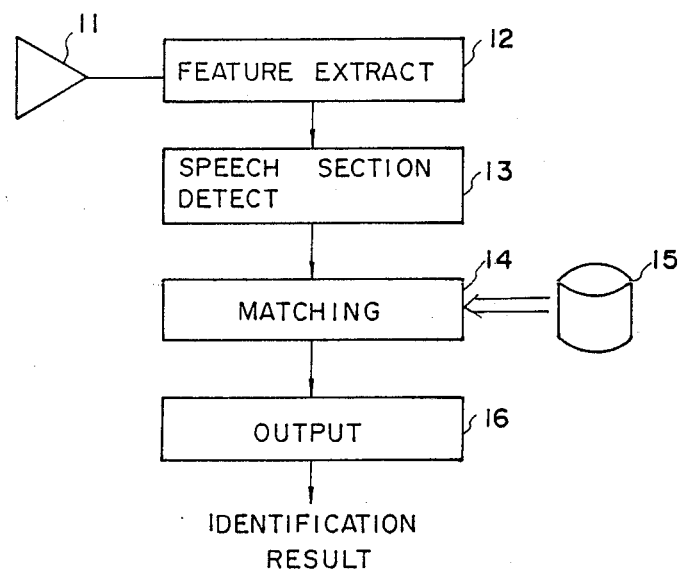
FIG. 1 is a block diagram of the first embodiment of the present invention.

Referring to FIG. 1, an unknown speech is supplied to a feature extracting part 12 through a microphone 11. The feature extracting part 12 calculates a time series of feature vectors from the input speech pattern. The feature extracting part 12 may be constructed by a conventional feature extracting process. For example, a feature vector can be described by a speech spectrum, a fast Fourier transform (FFT) spectrum, a linear predictive coding Cepstrum, or the like. In the present embodiment, it is assumed that the feature extracting part 12 is constructed based on the spectrum extracting process. The feature extracting parts 12 contains a group of 15-channel bandpass filters arranged at an interval of ⅓ octave within a frequency range from 250 to 6300 [kHz]. Spectrum patterns on the 15 channels are outputted at a frame period of 10 [ms], for example.

The spectrum patterns thus obtained are supplied to a speech section detecting part 13. Various methods for detecting the speech section have been proposed, and an arbitrary method out thereof may be used for constructing the speech section detecting part 13.

The time sequence of feature vectors obtained at the output of the speech section detecting part 13 may be described as follows:

$X = x_1 x_2 x_3 \ldots x_I$ $x_i = (x_{1i}, x_{2i}, x_{3i}, \ldots, x_{15i})$ where I denotes a number of frames of the input speech, $x_i$ (i=1~I) denotes a feature vector of the i'th frame of the input speech, and $x_{fi}$ (f=1~15) denotes an output on the f'th channel of the i'th frame of the input speech.

A reference pattern has been registered in a dictionary 15 in the following format:

$Y = y_1 y_2 y_3 \ldots y_N$ $y_j = (y_{1j}, y_{2j}, y_{3j}, \ldots, y_{15j})$ $L = (l_1, l_2, l_3, \ldots, l_N)$ Where N denotes a number of states, $y_j$ (j=1~N) denotes a feature vector (centroid) in the j'th state of the reference pattern, $y_{fj}$ denotes a value of the f'th channel in the j'th state of the reference pattern, and $l_j$ denotes a duration time (a frame length) of the j'th state of the reference pattern.

A matching part 14 performs pattern matching between the input speech pattern and the reference pattern. Various algorithms of the pattern matching based on a dynamic programing method and a climbing method have been proposed, and any one of them can be used for the present pattern matching. It is to be noted that although the algorithm itself for the pattern matching int the embodiment is conventional, the reference pattern is clearly distinct from the conventional one. In the following description, it is assumed that the matching part 14 is constructed based on the dynamic programming matching. The matching part 14 executes a sequence consisting of the following three steps:

Step 1: $D(1,1) = d(1,1)$
Step 2: for $2 \leq i \leq I$
$D(i,1) = D(i-1,1) + d(i,1)$
for $2 \leq j \leq N$
$D(i,j) = d(i,j) + \min \begin{cases} D(i-1, j-1) + W \\ D(i-1, j) \end{cases}$
Step 3: (accumulated distance between the reference pattern and the input speech) = $D(I,N)$ where i denotes an input frame number, j denotes a state number, d(i,j) denotes a local distance between the i'th frame of the input speech and the j'th state of the reference pattern, D(i,j) denotes an accumulated distance of an optimum path which reaches a lattice point (i,j), and W denotes a weight. Also, "min" denotes an operation for selecting a smaller one of the accumulated distance [D(i-1, j-1)+W] and D(i-1,j).

Figure 2:
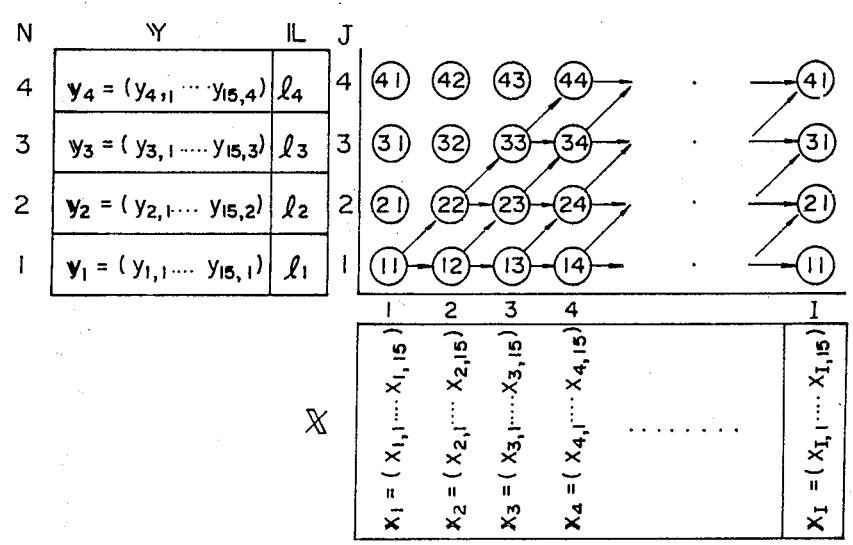
FIG. 2 is a view for explaining pattern matching provided by the first embodiment.

FIG. 2 is a view for explaining the pattern matching in accordance with the above sequence of steps 1 through 3. In FIG. 2, the horizontal axis represents I number of frames of the input pattern, and the vertical axis represents N number of states of the reference pattern. One circle enclosing two figures represents one lattice point (i,j). The feature vector X of the input pattern is shown along the horizontal axis, and the reference pattern Y (N=4) is shown along the vertical axis.

The local distance d(i,j) may be calculated based on any one of conventional distance calculation methods such as the city block distance calculation method, the Euclidean distance calculation method, and the Mahalanobis distance calculation method. For example, in the case where the city block distance calculation method is used, the local distance d(i,j) is calculated in the following formula:

$$d(i,j) = \sum_{f=1}^{15} |x_{fi} - y_{fi}|$$

In this manner, one local distance d(i,j) with respect to one lattice point (i,j) is calculated.

In the step of obtaining the accumulated distance D(i,j), when the state transition from the (j−1)'th state to the j'th state occurs, the weight W is added to the local distance D(i−1, j−1) as defined in formula shown in the above step 2. The employment of weight W is intended for comparing a duration time of the (j−1)'th state of the reference pattern with a duration time during which the input pattern belongs to the (j−1)'th state. In other words, the duration time of the (j−1)'th state of the reference pattern is compared with a frame length of the input pattern within which the input pattern belongs to the (j−1)'th state. Hereafter, the duration time of the (j−1)'th state of the reference pattern is referred to as a reference duration time, and on the other hand, the duration time during which the input pattern belongs to the (j−1)'th state is referred to as just a duration time.

Figure 3:
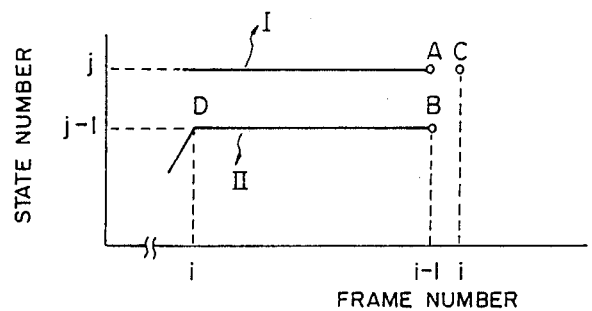
FIG. 3 is a view for explaining a state transition.

As shown in FIG. 3, the optimum path reaching a lattice point C(i,j) is selected out of the optimum path I reaching a lattice point A(i−1,j) and the optimum path II reaching a lattice point B(i−1,j−1). Now assuming that the input frame number obtained when the first transition to the (j−1)'th state occurs at i' with respect to the path II reaching the lattice point B, the duration time of the input pattern with respect to the (j−1)'th state corresponds to (i−i') frames. Further it is assumed that the reference duration time of the (j−1)'th state of the reference time is $l_{j-1}$. Under these conditions, the weight W with respect to the state transition from the (j−1)'th state to the j'th state can be defined as follows:
$$W = [(i-i') - l_{j-1}]^2.$$

As can be seen from this formula, the weight W is proportional to a square of the difference between the reference duration time $l_{j-1}$ and the duration time (i-i'). The weight W is set relatively small when the difference between the reference duration time of the reference pattern and the duration time of the input pattern is relatively small, in other words, when a deviation in the duration time between the reference pattern and the input pattern is relatively small. On the other hand, as the difference between the reference duration time and the duration time is increased, the weight W is increased. It is to be noted that the feature vector Y of the reference pattern does not include information on a duration time of the pattern. Therefore, if the accumulated distance D is calculated by simply accumulating the local distance d without using the weight W, the identical accumulated distance may be obtained for each of the plurality of unknown input speeches having different duration times. The employment of the weight W enables such a problem to be avoided.

In place of the formula defining the weight W, the weight W may be defined as follows:

$$W = \begin{cases} 0 & l_{j-1}/2 \leq i - i' \leq 2l_{j-1} \\ \infty & i - i' < l_{j-1}/2 \text{ or } i - i' > 2l_{j-1} \end{cases}$$

According to this formula, the duration time during which the input pattern is in the state (j−1) is limited to a range of ½~2 times greater than the duration time $l_{j-1}$ of the state (j−1) of the reference pattern. In this way, a path having a relatively large difference in the duration time between the input pattern and the reference pattern can be expelled, and the state transition can be facilitated.

Figure 4:
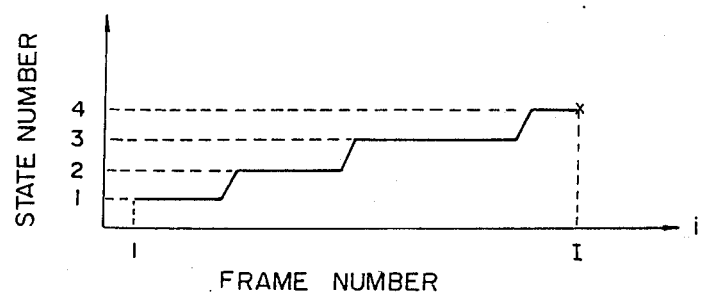
FIG. 4 is a view showing the optimum path obtained by the first embodiment.

In this manner, the optimum path consisting of a sequence of states is determined as shown in FIG. 4. Then, the accumulated distance D(I,N) of the determined optimum path is supplied, as a result of the matching, to a recognition result outputting part 16. The recognition result outputting part 16 stores the matching result in a built-in memory (not shown). The above operation is carried out for each of the reference patterns stored in the dictionary 15. Then each of the recognition results is stored into the built-in memory. Thereafter, the recognition result outputting part 16 selects one reference pattern having the optimum path having the accumulated distance smaller than the accumulated distances of the optimum paths of the other reference patterns. Finally, the recognition result outputting part 16 outputs, an identification result, and the selected reference pattern.

Figure 5A:
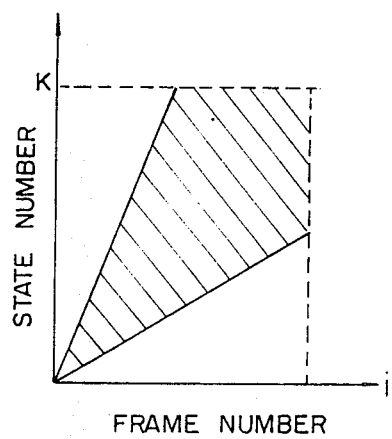
FIGS. 5A and 5B are views for explaining a difference in calculation amount between the conventional pattern matching and the pattern matching provided by the first embodiment.
Figure 5B:
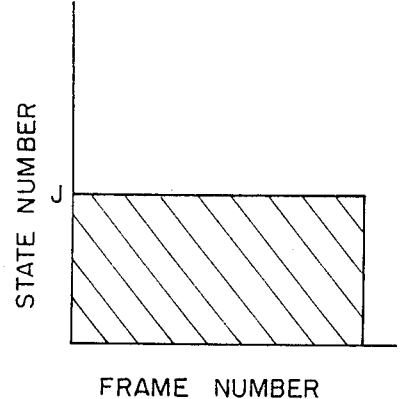

It is noted that the reference pattern used in the conventional dynamic programming matching has the same format as that of the input pattern. Therefore, a matching plane in the dynamic programming matching is obtained as shown in FIG. 5A. In general, a word having a frame period of 10 [ms] is composed of approximately 60 frames (corresponding to 600 [ms]). Therefore, when such a word is subjected to the pattern recognition based on the dynamic programming, a number of lattice points (I×K; K represents a number of frames of the reference pattern) becomes equal to 3600. On the other hand, according toe the present invention, the number of lattice points (I×J) becomes equal to 240 for N=4, as shown in FIG. 5B. As a result, the amount of calculation on the pattern matching based on the present invention can be greatly reduced, compared with the conventional pattern matching. Additionally, a memory having a smaller memory capacity may be used for constituting the dictionary 15.

A description is now given of a second embodiment of the present invention. The second embodiment contains a function of creating a reference pattern and registering a created reference pattern into the dictionary.

Figure 6:
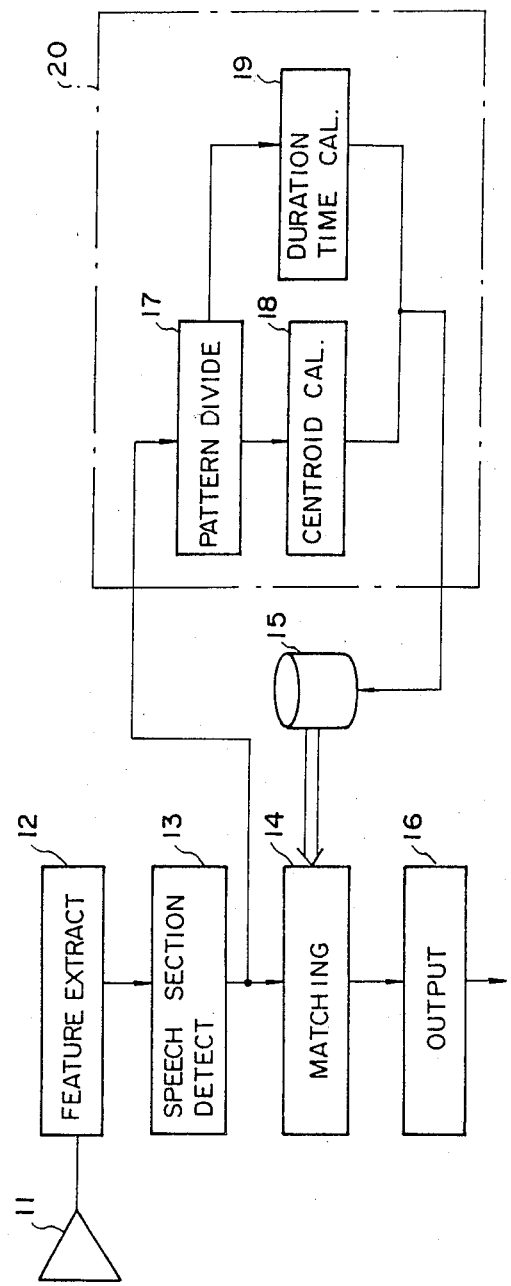
FIG. 6 is a block diagram of the second embodiment of the present invention having a function of creating and registering a reference pattern which can be suitably used as a reference pattern in the first embodiment.

FIG. 6 is a block diagram of the second embodiment of the present invention, in which the same elements as those in FIG. 1 are indicated by the same reference numerals. The block configuration of the second embodiment can be constituted by adding a reference pattern creating and registering part 20 to the block configuration of FIG. 1. The reference pattern creating and registering part 20 is made up of a speech pattern dividing part 17, a centroid calculating part 18 and a duration time calculating part 19. The speech pattern dividing part 17 has a function of equally dividing the input speech pattern derived from the speech section detecting part 13 into N number of speech pattern portions mutually identical frame lengths. One speech portion corresponds to one state. The divided speech pattern portions are supplied to the centroid calculating part 18 and also to the duration time calculating part 19. The duration time calculating part 19 calculates the duration time $l_j$ of the speech pattern which belongs to the j'th state ($j=1\sim N$) in accordance with the following formula:

$$l_j = (e_j - s_j + 1) \times T$$

where $s_j$ denotes a frame number of a start frame out of the frames which belong to the j'th state, $e_j$ denotes a frame number of an end frame out of the frames which belong to the j'th state, and T denotes a duration time of one frame. The centroid calculating part 18 calculates one centroid (feature vector) ($y_j$) from the feature vectors of all the frames included in the j'th state. The calculated centroid represents a feature quantity of the speech pattern portion belonging to the j'th state. In the case where the matching part 14 performs the pattern matching by calculating the city block distance, the centroid calculating part 18 calculates one centroid $y_j$ by calculating the city block distance among the feature vectors $x_{sj} \sim h_{ej}$ in the j'th state. Alternatively, in the case where the matching part 14 is based on the Euclidean distance, one centroid $y_j$ of the j'th state can be obtained as follows;

$$y_j = (y_{1j}, y_{2j}, \ldots, f_{fj}, \ldots, f_{15j})$$

$$y_{fj} = 1/l_j \sum_{i=s_j}^{e_j} x_{fi}$$

That is, the element $y_{fj}$ of the centroid is a mean value of the elements $x_{fsj} \sim x_{fej}$ which belong to the j'th state. In the spoken word recognition, it is sufficient for N to be set equal to a value in a range of 4 to 16. Normally, when the frame period is set to 10 [ms], a length of one word corresponds to approximately 60 frames. As a result, the reference pattern based on the present invention can be compressed by N/60, compared with the reference pattern used in the conventional speech recognition. The centroid and the duration time with respect to each state are supplied to the dictionary 15 and are registered therein.

Figure 7:
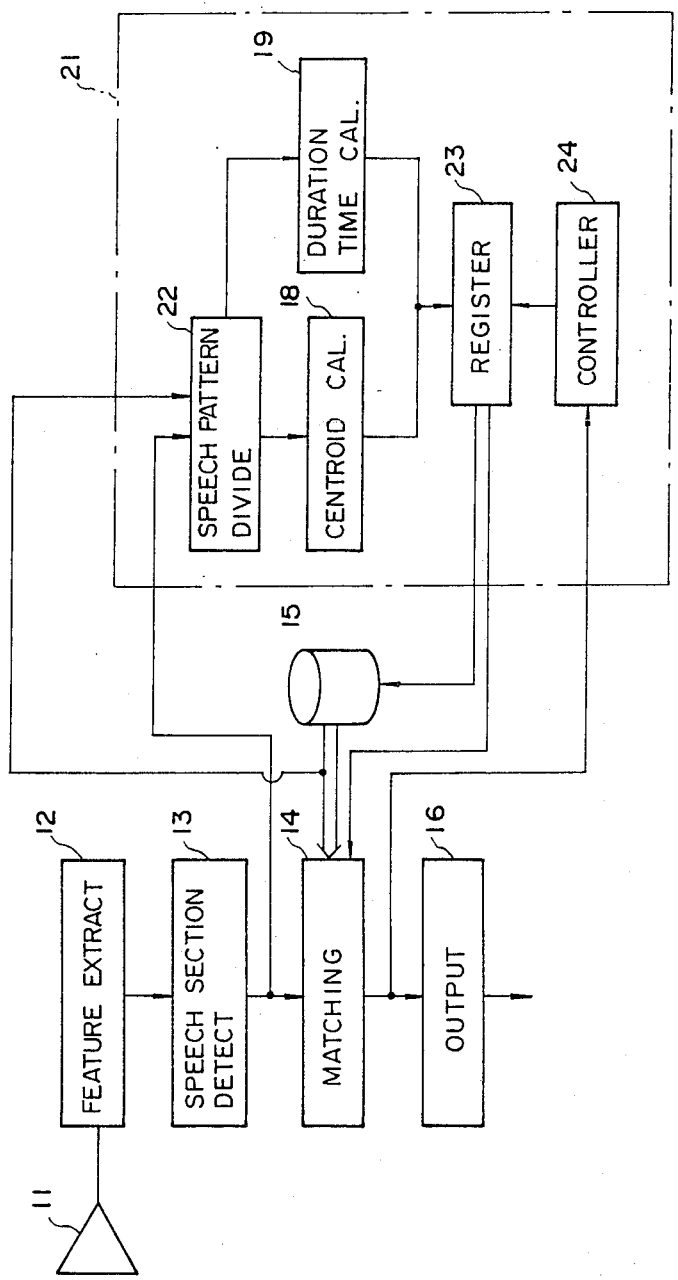
FIG. 7 is a block diagram of a variation of the second embodiment of FIG. 6.

A description is given of a variation of the second embodiment of FIG. 6 with reference to FIG. 7, in which the same reference numerals denote the same structural elements. The original speech pattern and the created reference pattern are read out from the dictionary 15. The original speech pattern is stored in the dictionary 15 when the original speech pattern is supplied to a speech patern dividing part 22 of a reference pattern creating and registering part 21. Then, the reference pattern created in the second embodiment is compared with the original speech pattern by the matching part 14. The matching part 14 performs the pattern matching between the original speech pattern and the created reference pattern. For example, when the matching part 14 is based on the Euclidean distance, the accumulated distance D can be obtained as follows:

$$D = \sum_{L=1}^{I} \text{dist}(x_i, y_{j(i)})$$

where j(i) denotes the state number to which the frame i belongs to, and dist($x_i$, $y_{j(i)}$) denotes an Euclidean distance between the feature vector $x_i$ of the i'th frame of the speech pattern and the centroid (feature vector) $y_{j(i)}$ of the j'th state of the reference pattern. It is to be noted that as the distance D decreases, the reference pattern has the better quality. In order to divide the original speech pattern into N numbers of speech pattern portions (states), (N−1) number of dividing points $b_j$ ($j=1\sim(N-1)$) are necessary. In this case, the start frame $s_j$ and the end frame $e_j$ of the j'th state may be described as follows: $s_1 = 1$  $e_j = b_j$  $s_{j+1} = b_{j+1}$ (where $1 \le j \le (N-1)$  $e_N = I$ Therefore, with respect to all the combinations (where $1 \le b_1 < b_2 < \ldots < b_{N-1}$) of the dividing points $b_j$ ($1 \le j \le (N-1)$), the centroid of each of the states is calculated, and then the accumulated distance D is calculated. That is, the accumulated distances are calculated for ${}_IC_{N-1}$ number of the created reference patterns which are provided by all the combinations of the dividing points. Then, one reference pattern having the smallest accumulated distance D is selected out of ${}_IC_{N-1}$ numbers of the reference patterns. Then the feature vector Y and the duration time L of the selected reference pattern are registered in the dictionary 15.

Returning to FIG. 7, the original speech pattern is read out from the dictionary 15 and is then supplied to the speech pattern dividing part 21 of the reference pattern creating and generating part 21. The speech pattern dividing part 21 divides the original speech pattern into N pattern portions according to one combination of the dividing points which has not yet been used. Then, one reference pattern created in the above-described manner is stored in a register 23 and is also supplied to the matching part 14 through the register 23. The matching part 14 performs the pattern matching between the original speech pattern read out from the dictionary 15 and the reference pattern fed from the register 23. A result of the matching is supplied to a controller 24 provided in the reference pattern creating and registering part 21, and is stored in a built-in register (not shown). In this manner, the distances between the input speech pattern and each of the created reference patterns are calculated and stored in the built-in register of the controller 24. Then the controller 24 compares the calculated distances with one another, and selects the smallest distance out of the distances. Then the controller 24 makes the register 23 output the reference pattern having the selected smallest distance to the dictionary 15. Finally, the feature vector Y and the distance L of the selected reference pattern is registered, as one reference pattern, in the dictionary 15.

Figure 8:
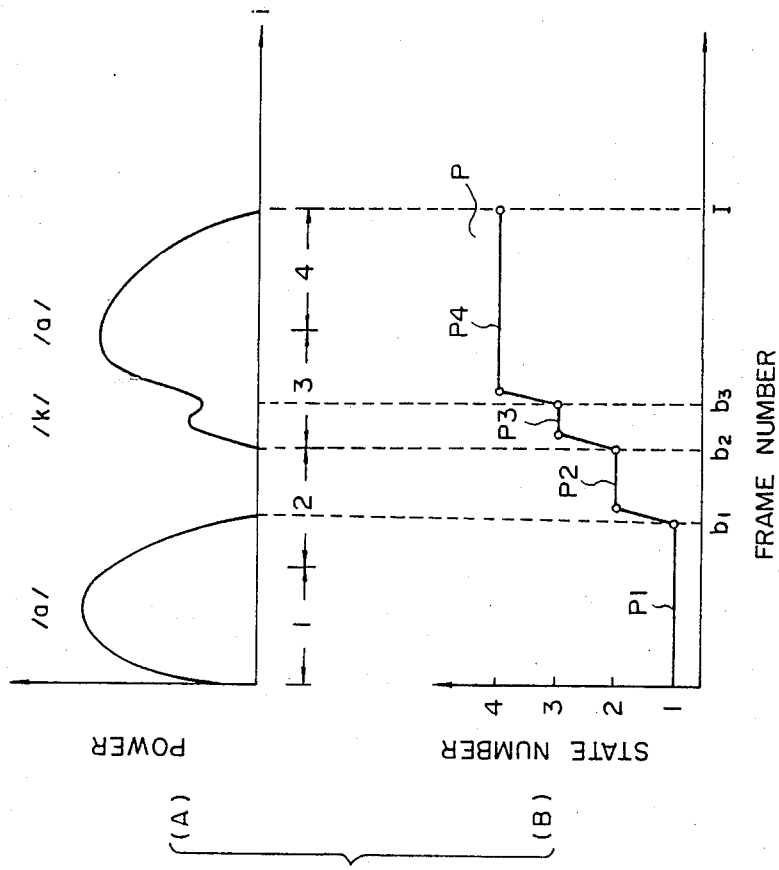
FIG. 8 is a view for explaining the creation and registration of the reference pattern based on the variation of the second embodiment.

A description is given of a third embodiment of the present invention with reference to FIGS. 8A and 8B. FIG. 8A shows a waveform of a spoken word "aka" in Japanese. In FIG. 8A, numerals 1 through 4 indicate states obtained by the second embodiment. That is, each of the states 1 through 4 has an identical frame length. In this case, the state 2 contains a part of feature vectors $x_{s1} \sim x_{el}$ of "a" as well as a silent section. Therefore, the reference pattern obtained by equally dividing the speech pattern of "aka" into four speech portions of states 1 through 4, is not a good reference pattern. On the other hand, an optimum reference pattern can be obtained according to the variation of the second embodiment described before with reference to FIG. 7. However, as described before, $_iC_{N-1}$ reference patterns must be compared with the original speech pattern. Therefore, a large quantity of calculation is required for obtaining the optimum reference pattern. In order to reduce the calculation amount, the third embodiment performs the pattern matching between the reference pattern obtained by the equal division of the input speech pattern and the original speech pattern in accordance with the matching process defined in the sequence of steps 1 through 3 described previously.

FIG. 8B shows the optimum path P obtained by the above matching. As shown, the path P reaching the lattice point (I,N) (where N=4 in the illustrated example) consists of four portions P1 through P4. Frames $1 \sim b_1$ included in the input speech pattern belong to the state 1, and frames $(b_1+1) \sim b_2$ belong to the state 2. A speech portion consisting of the frames $1 \sim b_1$ substantially corresponds to "a", and a speech portion consisting of frames $(b_1+1) \sim b_2$ substantially correspond to the silent section. Therefore, the original speech pattern is newly divided into four speech portions in which $b_1$, $b_2$ and $b_3$ are employed as the dividing points. Then, one centroid (feature vector) and duration time are calculated for each of the divided speech portions, and are registered in the dictionary.

Figure 9:
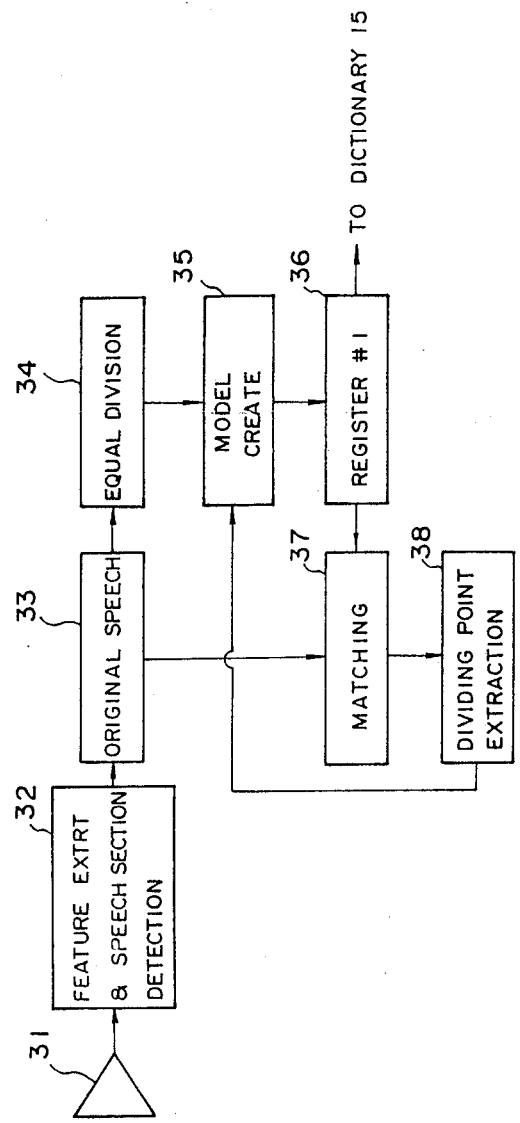
FIG. 9 is a block diagram of a third embodiment of the present invention.

FIG. 9 is a block diagram of implementing the third embodiment. N uttered speech is supplied to a block 32 having a function of extracting feature vectors from the speech and then detecting a speech section from the speech. That is, the block corresponds to the feature vector extracting part 12 and the speech section detecting part 13 described previously. A speech pattern containing the feature vectors of the input speech is stored in an original speech register 33. Then the speech pattern stored in the original speech register 33 is read out from the original speech register 33, and is then supplied to an equal division part 34. The equal division part 34 equally divides the speech pattern into a plurality of portions (states) as shown in FIG. 8(A). The divided speech portions are supplied to a model creating part 35, which corresponds to the centroid calculating part 18 and the duration time calculating part 19 shown in FIGS. 6 and 7. That is, the model creating part 35 produces one centroid and duration time of each of the equally divided speech portions. The centroids and duration times of the speech portions are supplied to a matching part 37 through a register 36. The matching part 37, which corresponds to the matching part 14 described previously, performs the pattern matching between the original speech read out from the original speech register 33 and the reference pattern supplied from the register 36. Then, a result of the pattern matching is supplied to a dividing point extracting part 38, where dividing points $b_1$, $b_2$ and $b_3$ shown in FIG. 8(B) are extracted from the optimum path obtained by the pattern matching, and are then supplied to the model creating part 35. The model creating part 35 creates a model by using the dividing points $b_1$, $b_2$ and $b_3$. Then, a created model, i.e., a centroid and a duration time of each of speech portions obtained by dividing the original speech at the dividing points $b_1$, $b_2$ and $b_3$ are outputted, as a reference pattern of the input speech, through the register 36.

Figure 10:
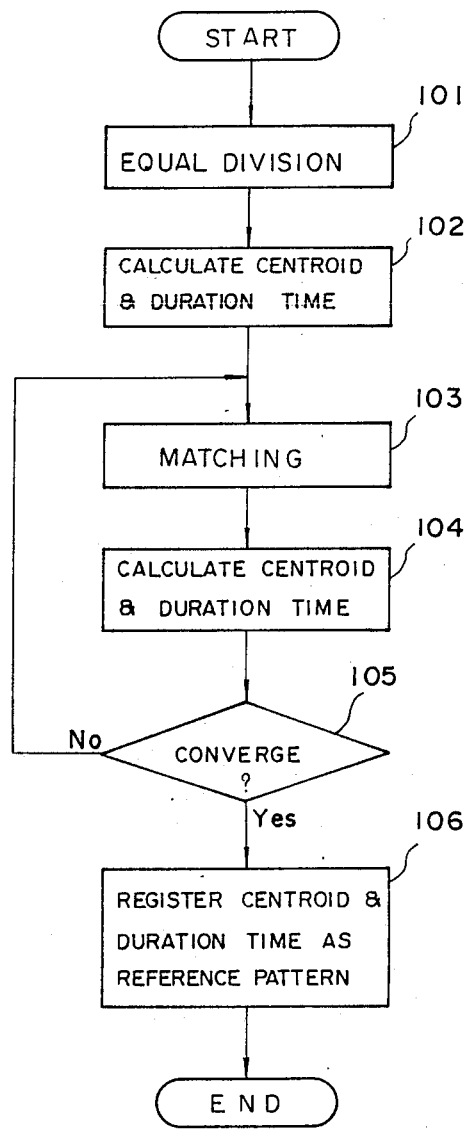
FIG. 10 is a flowchart showing an operation of the third embodiment.
Figure 11:
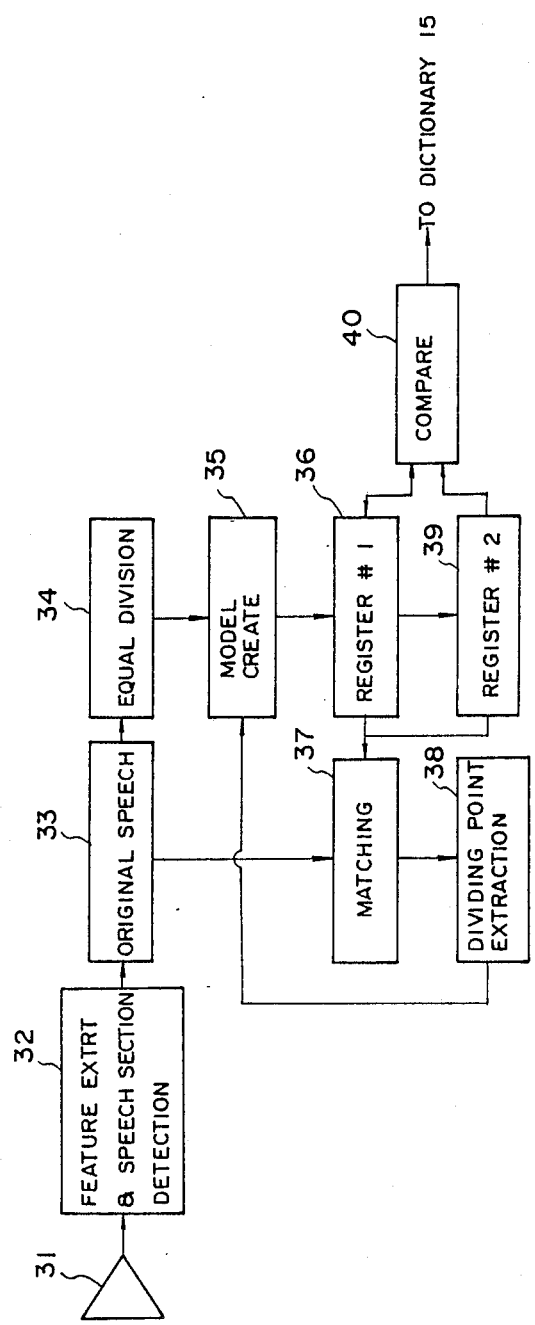
FIG. 11 is a block diagram of a fourth embodiment of the present invention.

A description is given of a fourth embodiment of the present invention with reference to FIGS. 10 and 11. The fourth embodiment is an improvement of the third embodiment shown in FIG. 9.

FIG. 10 is a flowchart showing a process for creating a reference pattern in accordance with the fourth embodiment. One of the essential features of the fourth embodiment is that a plurality of models (reference patterns) are sequentially created by changing dividing points, until a created model (reference pattern) which satisfies a predetermined condition is obtained. Referring to FIG. 10, the original speech pattern is equally divided into N portions (states) at step 101. Next, one reference pattern consisting of the centroids and duration times of the divided portions is calculated at step 102. Then the pattern matching between the created model and the original speech pattern is carried out at step 103, and thereby one optimum path such as the path P shown in FIG. 8(B) is obtained. Then new dividing points such as $b_1$, $b_2$ and $b_3$ are obtained and thereafter a second reference pattern is created by using the dividing points $b_1$, $b_2$ and $b_3$, at step 104. Subsequently it is checked, at step 105, as to whether or not the created reference pattern has converged. For example, it is checked whether or not the feature vector Y of the current reference pattern is equivalent to the feature vector Y of the previous reference pattern. For example, if feature vector Y of the current reference pattern is identical o the feature vector Y of the previous reference pattern, the current reference pattern is determined to have converged. In place of comparison in the feature vector, it may be checked whether or not the dividing points of the current reference pattern are identical to the dividing points of the previous reference pattern. For example, if the dividing points of the current reference pattern are identical to the dividing points of the previous reference pattern, the current reference pattern is determined to have converged. Alternatively, if the current reference pattern has not converged, the process returns to step 103, and the sequence composed of steps 103–105 is repetitively carried out. In this manner, the reference patterns are updated until the created reference pattern has converged. Finally, at step 106, the created reference pattern which is found to have converged is stored, as a finalized reference pattern, in the dictionary 5 shown in the previous figures.

A block configuration of the process shown by the flowchart of FIG. 10 is illustrated in FIG. 11, in which the same structural elements as those in FIG. 9 are indicated by the same reference numerals. An uttered speech is supplied to a block 32 having a function of extracting feature vectors from the speech and then detecting a speech section from the speech. Then the speech pattern stored in the original speech register 33 is read out from the original speech register 33, and is then supplied to the equal division part 34. The equal division part 34 equally divides the speech pattern into a plurality of portions (states) as shown in FIG. 8(A). The divided speech portions are supplied to the model creating part 35, which corresponds to the centroid calculating part 18 and the duration time calculating part 19 shown in FIGS. 6 and 7. That is, the model creating part 35 produces the centroid and duration time of each of the equally divided speech portions. The centroids and duration times of the speech portions are supplied to the matching part 37 through the register 36 and a register 39. At this time, the centroids and duration times of the speech portions are temporarily stored in the register 39. The matching part 37 performs the pattern matching between the original speech stored in the original speech register 33 and the reference pattern supplied from the register 39. Then, a result of the pattern matching is supplied to the dividing point extracting part 38, where dividing points $b_1$, $b_2$ and $b_3$ shown in FIG. 8(B) are extracted from the optimum path obtained by the pattern matching, and are then supplied to the model creating part 35. The model creating part 35 creates a model (second model) by using the dividing points $b_1$, $b_2$ and $b_3$. Then, a created model, i.e., the centroid and duration time of each of speech portions obtained by dividing the original speech at the dividing points $b_1$, $b_2$ and $b_3$ are supplied to the register 36.

Then, a comparing part 40 compares the content of the register 36 with the content of the register 39. That is, the first reference pattern having the equally divided states is compared with the second reference pattern having the dividing points $b_1$, $b_2$ and $b_3$. If the comparing part 40 detects that the feature vector Y (or dividing points) of the first reference pattern is equivalent to the feature vector Y (or dividing points) of the second reference pattern, the second reference pattern is determined to have converged. As a result, the second reference pattern is stored, as the finalized reference pattern for the input speech, into the dictionary 15. Alternatively, if the second reference pattern has not converged, the second reference pattern is supplied to the matching part 37 through the register 39. At this time, the second reference pattern is temporarily registered in the register 39. Then the matching part 37 compares the second reference pattern with the original speech pattern stored in the register 33. The matching part 37 produces the optimum path, and the dividing point extracting part 38 extracts dividing points from the obtained optimum path. The extracted dividing points are supplied to the model creating part 35, which creates a model, i.e., a third reference model. Then, calculated centroids and duration times of the third reference pattern are supplied to the register 36, and are compared with the second reference pattern in the comparing part 40. If the third reference pattern has converged, it is stored in the dictionary 15. Alternatively, it has not converged, the third reference pattern is supplied to the matching part 37.

In this manner, the above process is repetitively carried out until the reference pattern which has converged is obtained. The finalized reference pattern obtained by the fourth embodiment has a very high accuracy.

The present invention is not limited to the above-described embodiments, and variations and modifications may be made without departing from the scope of the present invention.

WHAT IS CLAIMED IS:

1. A speech recognition method comprising the steps of:
    extracting a feature vector (X) from an unknown input speech pattern which is composed of feature vectors $(X=x_1 x_2 x_3 ... x_I)$ of speech data included in I number of frames of the unknown input speech pattern;
    comparing the feature vector (X) of the input speech pattern with a plurality of reference patterns (Y);
    each of the reference patterns (Y) being represented as a time series having N number of states, each reference pattern being composed of a feature vector $(y_1 y_2 y_3 ... y_N)$ which represents a feature quantity of each of the states and a duration time $(L=l_1, l_2, l_3, ..., l_N)$ of each of the states, so that local distances (d) among I number of feature vectors of the input speech pattern and N number of feature vectors of each of the reference patterns are calculated, and also a difference between the duration time of each of the states included in each of the reference patterns and a duration time of a corresponding state of the input pattern is calculated;
    accumulating the obtained local distances in sequence along paths which extend from a beginning state to a last state out of the states of the reference pattern;
    adding weight (W) depending on the obtained difference in the duration time to the local distances when a transition of state occurs during the step of accumulating the local distances;
    determining one optimum path having the smallest accumulated distance (D) for each of the reference patterns;
    selecting, as an identification result, one reference pattern having the optimum path having the accumulated distance smaller than the accumulated distances of the optimum paths of the other reference patterns,
    wherein the weight (W) is a function of the difference in the duration time of each state between the input speech pattern and the reference pattern; and
    wherein the weight (W) has a value of 0 in the case where the duration time of each of the states of the input speech pattern is equal to or more than half of the duration time of the corresponding state of the reference pattern and is equal to or smaller than one and a half times the duration time of the corresponding state of the reference pattern, and wherein the weight (W) is set infinitive in cases other than the said case.

2. A speech recognition method as claimed in claim 1, wherein the weight (W) has a value proportional to a square of the difference in the duration time.

3. A speech recognition method as claimed in claim 1, wherein the number N of the states of the reference pattern is smaller than the number I of the frames of the input speech pattern.

4. A speech recognition apparatus comprising:
    means for extracting a feature vector (X) from an unknown input speech pattern which is composed of feature vectors $(X=x_1 x_2 x_3 ... x_I)$ of speech data included in I number of frames of the unknown input speech pattern;
    means for comparing the feature vector (X) of the input speech pattern with a plurality of reference patterns (Y) and for calculating an accumulated distance (D) between the input speech pattern and each of the reference patterns;
    each of the reference patterns (Y) being represented as a time series having N number of states, each reference pattern being composed of a feature vector $(y_1 y_2 y_3 ... y_N)$ which represents a feature quantity of each of the states and a duration time $(L=l_1, l_2, l_3, ..., l_N)$ of each of the states, so that local distances (d) among I number of feature vectors of each of the reference patterns are calculated, and also a difference between the duration time of each of the states included in each of the reference patterns and a duration time of a corresponding state of the input pattern is calculated;
    the accumulated distance being calculated by accumulating the obtained local distances in sequence along paths which extend from a beginning state to a last state out of the states of the reference pattern, and a weight (W) depending on the obtained difference in the duration time being added to the local distances when a transition of state occurs while accumulating the local distances;

outputting means for determining one optimum path having the smallest accumulated distance for each of the reference patterns and for selecting, as an identification result, one reference pattern having the optimum path having the accumulated distance smaller than the accumulated distance of the optimum paths of the other reference patterns, wherein the weight (W) is a function of the difference in the duration time of each state between the input speech pattern and the reference pattern; and wherein the weight (W) has a value of 0 in the case where the duration time of each of the states of the input speech pattern is equal to or more than half of the duration time of the corresponding state of the reference pattern and is equal to or smaller than one and half times the duration time of the corresponding state of the reference pattern, and wherein the weight (W) is set infinitive in cases other than the said case.

5. A speech recognition apparatus as claimed in claim 4, wherein the weight (W) has a value proportional to a square of the difference in the duration time.

6. A speech recognition apparatus as claimed in claim 4, wherein the number N of the states of the reference pattern is smaller than the number I of the frames of the input speech pattern.

7. A method of creating a reference pattern for use in speech recognition comprising the steps of:

extracting a feature vector (X) from an input speech pattern in a dictionary, the feature vector being composed of feature vectors $(X=x_1x_2x_3 \ldots x_I)$ of speech data included in I number of frames of the unknown input speech pattern;

dividing the input speech pattern into N number of speech pattern portions, thereby the feature vectors being grouped into N number of states;

calculating a feature vector $(y_1y_2y_3 \ldots y_N)$ representing a feature quantity of each of the states from the feature vectors included in each of the states;

calculating a duration time $(L=l_1, l_2, l_3, \ldots l_N)$ of each of the states, so that one reference pattern (Y) which is composed of the feature vector representing of each of the states and the duration time of each of the states is created, and is registered in a dictionary memory, wherein the input speech pattern is equally divided into N number of speech pattern portions, wherein the method further comprises the steps of:

comparing the feature vector (X) of the input speech pattern with the created reference pattern (Y), so that local distances (d) among I number of feature vectors of the input speech pattern and N number of feature vectors of the reference pattern are calculated, and also a difference between the duration time of each of the states included in each of the reference pattern and a duration time of a corresponding state of the input pattern is calculated;

accumulating the obtained local distances in sequence along paths which extend from a beginning state to a last state out of the states of the reference pattern; and adding a weight (W) depending on the obtained difference in the duration time to the local distances when a transition of state occurs during the step of accumulating the local distances;

determining one optimum path having the smallest accumulated distance (D);

so that the input speech pattern is divided into N number of speech pattern portions at dividing points obtained from the optimum path, and the feature vector and the duration time of each of the states determined by the said dividing points are calculated and then registered as a finalized reference pattern.

8. A method of creating a reference pattern as claimed in claim 7, wherein the dividing step is repetitively performed by changing (N−1) number of dividing points, and the feature vector calculating step and the duration time calculation step are performed for each of the combinations of the divided input speech patterns, and wherein the method further comprises steps of performing pattern matching between the feature vector (X) of the input speech pattern and each of the reference patterns (Y) created from the divided input speech patterns; and selecting one reference pattern out of the created reference patterns, the selected reference pattern having the smallest difference with respect to the input speech pattern.

9. A method of creating a reference pattern as claimed in claim 7, wherein the steps other than the step of extracting the feature vector are respectively carried out until a reference pattern which satisfies a predetermined condition is obtained.

10. A method of creating a reference pattern as claimed in claim 9, wherein when the current reference pattern equivalent to the previous reference pattern is obtained, the current reference pattern is registered as the finalized reference pattern.

11. An apparatus for creating a reference pattern for use in speech recognition comprising;

means for extracting a feature vector (X) from an input speech pattern in a dictionary, the feature vector being composed of feature vectors $(X=x_1x_2x_3 \ldots x_I)$ of speech data included in I number of frames of the unknown input speech pattern;

means for equally dividing the input speech pattern into N number of speech pattern portions, thereby the feature vectors being grouped into N number of states;

means for calculating a feature vector $(y_1y_2y_3 \ldots y_N)$ representing a feature quantity of each of the states from the feature vectors included in each of the states;

means for calculating a duration time $(L=l_1, l_2, l_3, \ldots, l_N)$ of each of the states, so that one reference pattern (Y) which is composed of the feature vector representing of each of the states and the duration time of each of the states is created, and is registered in a dictionary memory, wherein the apparatus further comprises:

means for comparing the feature vector (X) of the input speech pattern with the created reference pattern (Y), so that local distance (d) among I number of feature vectors of the input speech pattern and N number of feature vectors of the reference pattern are calculated, and also a difference between the duration time of each of the states included in each of the reference pattern and a duration time of a corresponding state of the input pattern is calculated;

the accumulated distance being calculated by accumulating the obtained distances in sequence along paths which extend from a beginning state to a last state out of the states of the reference pattern, and a weight (W) depending on the obtained difference in the duration time being added to the local distances when a transition of stat occurs during the step of accumulating the local distances;

means for determining one optimum path having the smallest accumulated distance (D); and means for extracting dividing points from the optimum path having the smallest accumulated distance, so that the input speech pattern is divided into N number of speech pattern portions at dividing points obtained from the optimum path, and the feature vector and the duration time of each of the states determined by the said dividing points are calculated and then registered as a finalized reference pattern.

12. An apparatus for creating a reference pattern as claimed in claim 11, wherein the dividing means repetitively divides the input speech pattern by changing (N−1) number of dividing points, and the feature vector calculating means and the duration time calculation means performs the calculations of the feature vectors and the duration times for each of the combinations of the divided input speech patterns, and wherein the apparatus further comprises means for performing pattern matching between the feature vector (X) of the input speech pattern and each of the reference patterns (Y) created from the divided input speech patterns; and means for selecting one reference pattern out of the created reference patterns, the selected reference pattern having the smallest difference with respect to the input speech pattern.

13. An apparatus for creating a reference pattern as claimed in claim 11, wherein the apparatus further comprises means for comparing a current reference pattern with a previous reference pattern, so that when the current reference pattern satisfies a predetermined condition, the current reference pattern is outputted as the finalized reference pattern to be registered as in the dictionary.

* * * * *